United States Patent
Gomi et al.

(10) Patent No.: US 11,231,758 B2
(45) Date of Patent: Jan. 25, 2022

(54) SEMICONDUCTOR DEVICE, THERMO-CONTROL DEVICE, AND METHODS

(71) Applicant: RENESAS ELECTRONICS CORPORATION, Tokyo (JP)

(72) Inventors: Takahiko Gomi, Tokyo (JP); Gaku Inami, Tokyo (JP); Ryu Nagasawa, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 143 days.

(21) Appl. No.: 16/687,276

(22) Filed: Nov. 18, 2019

(65) Prior Publication Data
US 2020/0209929 A1 Jul. 2, 2020

(30) Foreign Application Priority Data
Dec. 26, 2018 (JP) .............................. JP2018-242604

(51) Int. Cl.
*G06F 1/20* (2006.01)
*G05B 15/02* (2006.01)
(Continued)

(52) U.S. Cl.
CPC ............ *G06F 1/206* (2013.01); *G05B 15/02* (2013.01); *G06F 1/324* (2013.01); *G06F 1/3287* (2013.01);
(Continued)

(58) Field of Classification Search
CPC ........ G06F 1/206; G06F 1/324; G06F 1/3287; G06F 9/5094; G06F 2209/5021; G05B 15/02
See application file for complete search history.

(56) References Cited

U.S. PATENT DOCUMENTS 8,068,940 B2 11/2011 Adachi et al.
2004/0128100 A1* 7/2004 Rotem .................. G01K 7/42
702/136
(Continued)

FOREIGN PATENT DOCUMENTS

JP 2007-109085 A 4/2007

OTHER PUBLICATIONS

Xin Wang, "Intelligent Power Allocation Maximize performance in the thermal envelope", Mar. 2017, http://infocenter.arm.com/help/topic/com.arm.doc.dto0052a/DTO0052A_intelligent_power_allocation_white_paper.pdf.

*Primary Examiner* — Gary Collins
(74) *Attorney, Agent, or Firm* — McDermott Will & Emery LLP

(57) ABSTRACT

The CPU includes a plurality of CPU cores. The temperature determination unit determines whether or not the temperature indicated by the acquired temperature information is equal to or higher than a threshold value. When it is determined that the temperature indicated by the temperature data is equal to or higher than the threshold value, the thermal generation control unit performs thermal generation control on the CPU. The group data includes high-priority group information specifying a CPU core of a first group to which execute of a high-priority application is allocated in the CPU, and low-priority group information specifying a CPU core of a low-priority group to which execution of a low-priority application is allocated in the CPU. Based on the group data, the control target determining unit determines a CPU core to be subjected to thermal generation control from among the CPU cores of the low priority group.

11 Claims, 10 Drawing Sheets

(51) Int. Cl.
*G06F 1/3287* (2019.01)
*G06F 9/50* (2006.01)
*G06F 1/324* (2019.01)

(52) U.S. Cl.
CPC .... *G06F 9/5094* (2013.01); *G06F 2209/5021* (2013.01)

(56) References Cited

U.S. PATENT DOCUMENTS

| | | | |
|---|---|---|---|
| 2013/0246820 A1* | 9/2013 | Branover | G06F 1/324 713/320 |
| 2015/0121105 A1* | 4/2015 | Ahn | G06F 1/3293 713/322 |
| 2017/0168532 A1* | 6/2017 | Kim | G06F 1/206 |
| 2019/0041971 A1* | 2/2019 | Ananthakrishnan | G06F 1/3206 |

* cited by examiner

FIG. 3A

| ITEM | DATA |
|---|---|
| GROUP TYPE | HIGH-PRIORITY |
| APPLICATIONS | A, B, C |
| ALLOCATION CPU | CPU0, CPU1 |

FIG. 3B

| ITEM | DATA |
|---|---|
| GROUP TYPE | LOW-PRIORITY |
| APPLICATIONS | D, E, F |
| ALLOCATION CPU | CPU2, CPU3 |

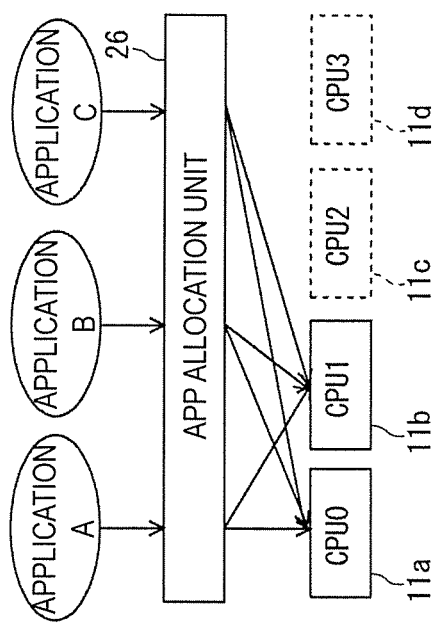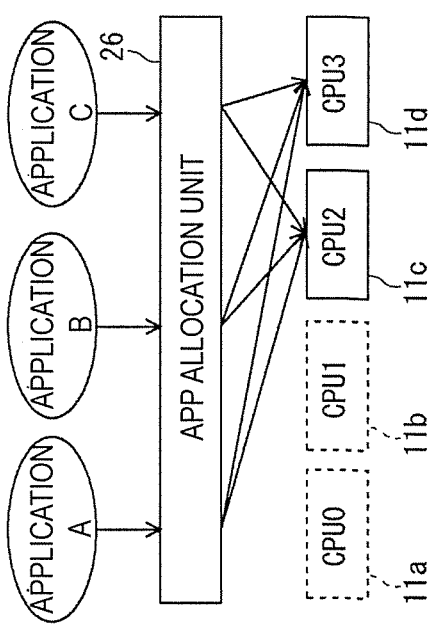

| ITEM | DATA |
|---|---|
| GROUP TYPE | HIGH-PRIORITY |
| APPLICATIONS | A, B, C |
| ALLOCATION CPU | CPU0, CPU1, CPU2, CPU3 |

| ITEM | DATA |
|---|---|
| GROUP TYPE | LOW-PRIORITY |
| APPLICATIONS | D, E, F |
| ALLOCATION CPU | CPU0, CPU1, CPU2, CPU3 |

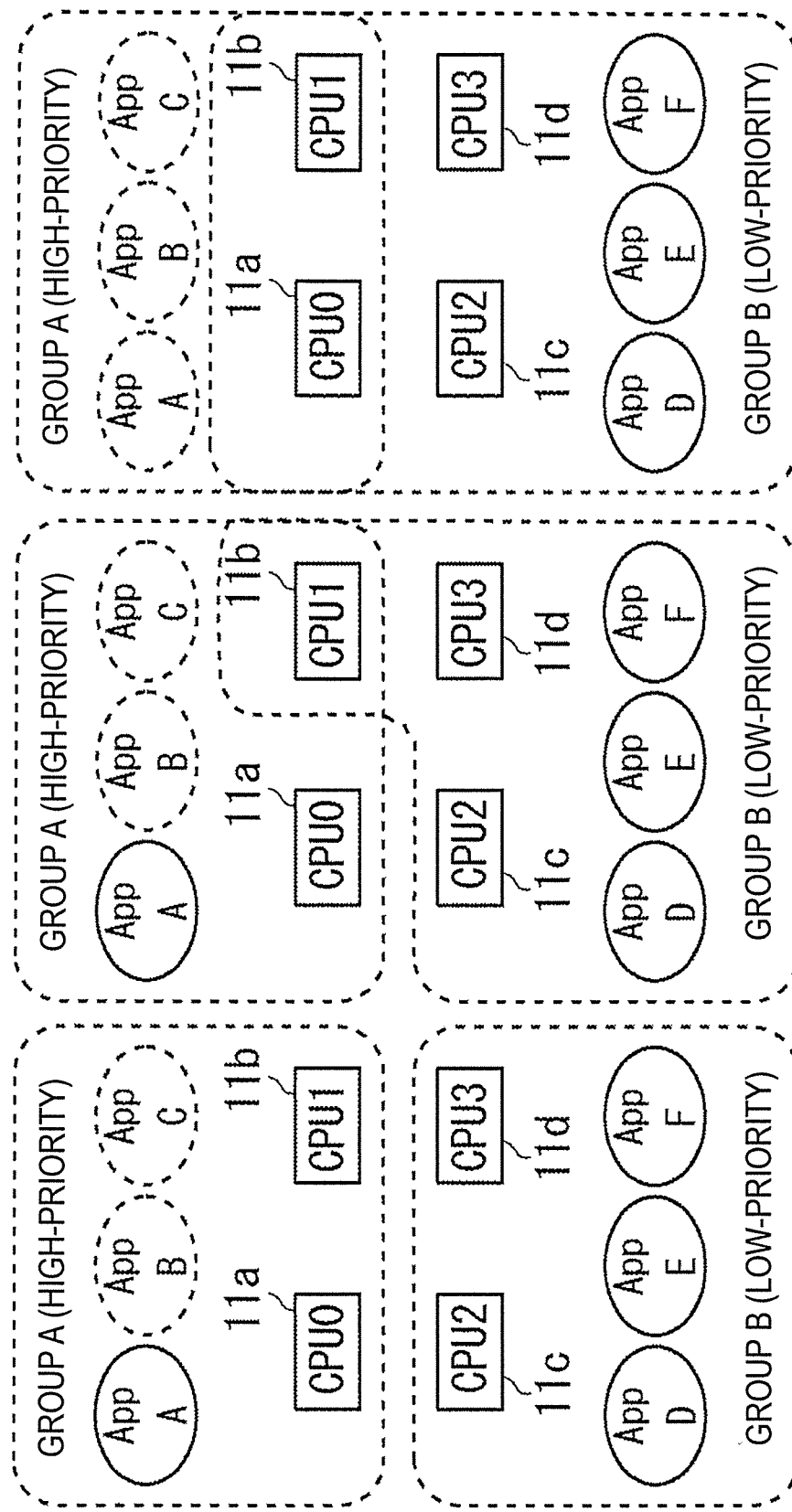

SEMICONDUCTOR DEVICE, THERMO-CONTROL DEVICE, AND METHODS

CROSS-REFERENCE TO RELATED APPLICATIONS

The disclosure of Japanese Patent Application No. 2018-242604 filed on Dec. 26, 2018 including the specification, drawings and abstract is incorporated herein by reference in its entirety.

BACKGROUND

The present invention relates to a semiconductor device, a temperature control device, and a method, for example, a semiconductor device including a processor for executing an application, and a temperature control device and method in such a semiconductor device.

The Background of the Invention

As a related art, Xin Wang, "Intelligent Power Allocation Maximize performance in the thermal envelope", March 2017, discloses an IPA (Intelligent Power Allocation) used for thermal generation control of a control target. IPA is a thermal control framework developed by ARM. The IPA acquires temperature information from a temperature sensor that is arbitrarily set, calculates available power consumption for a plurality of modules that are controlled by the IPA, and performs thermal generation control by adjusting a clock.

More specifically, the IPA calculates the power consumption available for PID (Proportional-Integral-Differential) control based on the temperature information acquired from the temperature sensor so that the temperature of the IPA saturates at a preset target temperature, and distributes the power consumption available to the modules to be controlled based on an arbitrary fixed coefficient (see Chapter 2.2.4 of "Intelligent Power Allocation Maximize performance in the thermal envelope"). The IPA determines the frequency by comparing the distributed power consumption with a correspondence table in which the available frequencies are registered in advance. In the IPA, dynamic power can be reduced by lowering the frequency, and thermal generation control can be performed.

As another related art, Japanese unexamined Patent Application publication 2007-109085 discloses a thermal generation control device for efficiently controlling thermal generation of computer systems. The thermal generation control device disclosed in Japanese unexamined Patent Application publication 2007-109085 acquires a thermal generation state of a target portion, which is a control target of the thermal generation state, in the hardware of the computer system. The thermal generation control device changes the operation content of the application being operated so as to change the thermal generation state in accordance with the acquired thermal generation state. Here, "changing the operation content of the application" means directly operating the application to change the operation content so that the processing capability of the hardware required by the application changes.

The device changes, for example, the operation mode of an application operating in the normal mode to a slow mode requiring a processing speed lower than that required by the normal mode. Alternatively, the thermal generation control device maintains the main functional part of the application in the normal mode, and changes the process mode of the other functions to the low-speed mode. Patent Document 1 also discloses giving priority to each function realized by an application, and suppressing the operation of a portion realizing the function as the priority becomes lower for an application in operation. Further, Japanese unexamined Patent Application publication 2007-109085 discloses that the thermal generation state of a target site is controlled by using a change in the operation content of an application and an operation adjustment of hardware such as an adjustment of an operation frequency of a processor in combination.

Prior-Art Document

SUMMARY

In the IPA disclosed in "Intelligent Power Allocation Maximize performance in the thermal envelope", March 2017, thermal generation control (performance reduction) of a target module is performed in accordance with a fixed coefficient set in advance in accordance with a thermal generation state. While this method can suppress thermal generation, the performance is degraded in all of the functions being performed on the target module. For example, even if the function executed on the target module is a function related to the safety of the driver of the vehicle on which the target module is mounted or a function related to the user experience, the performance is degraded. The reduced performance of these functions impairs driver safety and user experience.

As a specific example, it is assumed that the DMS (Driver Monitoring System) function and the meter cluster function operate simultaneously in the in-vehicle system. Here, the meter cluster function refers to a function of operating a meter class, which is a unit in which various meters necessary for driving are assembled. In the IPA disclosed in "Intelligent Power Allocation Maximize performance in the thermal envelope", March 2017, if the thermal generation control is performed during driving, not only the DMS having a low importance but also the meter cluster function is degraded in performance, which may hinder the driving.

On the other hand, in the thermal generation control device disclosed in Japanese unexamined Patent Application publication 2007-109085, it is possible to suppress the operation of the low-priority function according to the priority. However, in Japanese unexamined Patent Application publication 2007-109085, for example, when the temperature of the main processor exceeds a threshold value, the operation content of the application running on the main processor is changed and the operating frequency of the main processor is adjusted. In this case, even if the operation content of the high-priority function is not changed in the change of the operation content of the application operating on the main processor, if the operation frequency of the main processor is lowered, the performance degradation of the high-priority function cannot be avoided.

Other objects and novel features will become apparent from the description of this specification and the accompanying drawings.

According to one embodiment, the semiconductor device includes: a thermal generation control unit that performs thermal generation control on a CPU including a plurality of CPU (Central Processing Unit) cores; and a control target determination unit that determines a target of the thermal generation control. The control target determination unit determines a target of thermal generation control from among the CPU cores to which execution of low-priority applications is allocated.

According to the embodiment, the thermal generation control device can reduce the amount of thermal generated by the CPUs while maintaining the performance of executing a particular application.

BRIEF DESCRIPTION OF THE DRAWINGS

FIG. 3A shows an example of high priority group information, and FIG. 3B shows an example of low priority group information.

FIGS. 4A and 4B are schematic diagrams showing a relationship between an application of each priority and a CPU core to which execute is allocated.

FIGS. 10A to 10C are schematic diagrams showing a relationship between an application and a CPU core to which execution of the application is allocated.

DETAILED DESCRIPTION

Figure 1:
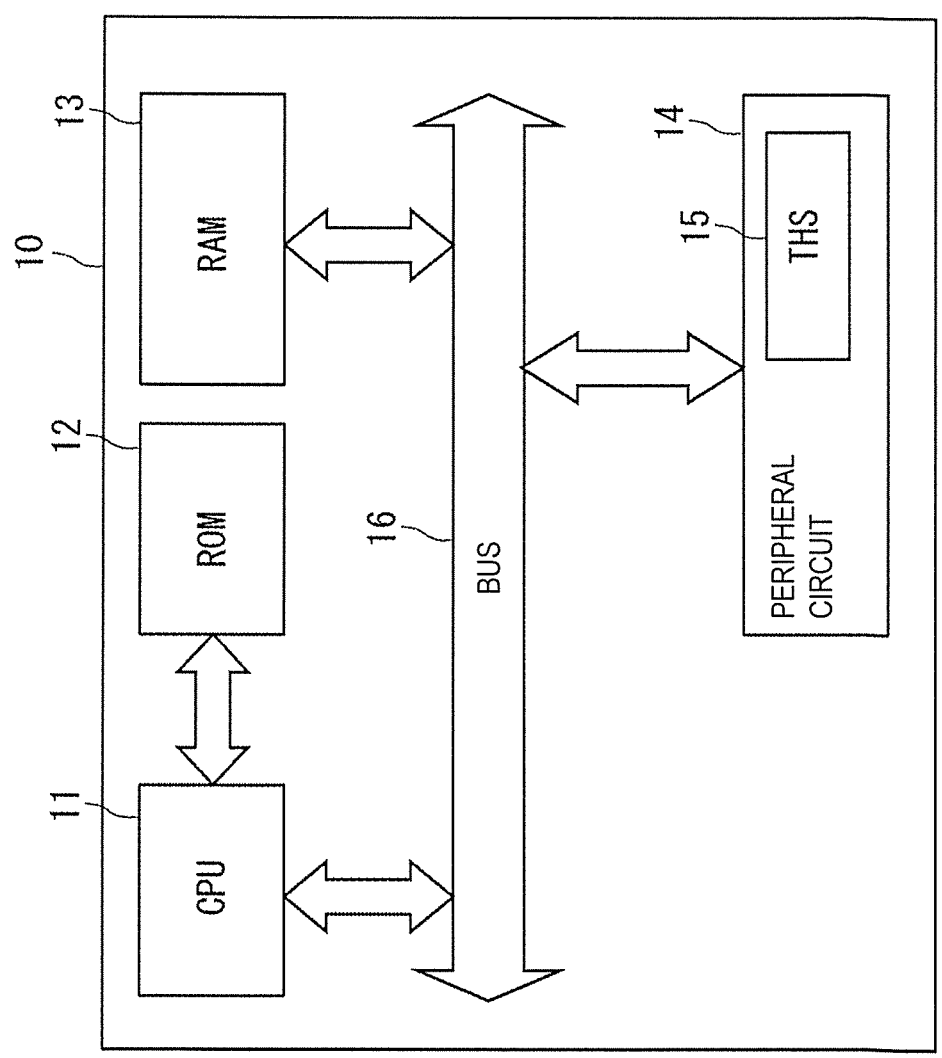
FIG. 1 is a block diagram showing a hardware configuration of a semiconductor device according to a first embodiment.

Embodiments to which means for solving the above problems is applied will be described in detail below with reference to the drawings. For clarity of explanation, the following description and drawings are appropriately omitted and simplified. In addition, the elements described in the drawings as functional blocks for performing various processes can be configured as a CPU, a memory, and other circuits in terms of hardware, and are realized by programs loaded into the memories in terms of software. Therefore, it is understood by those skilled in the art that these functional blocks can be realized in various forms by hardware alone, software alone, or a combination thereof, and the present invention is not limited to any of them. In the drawings, the same elements are denoted by the same reference numerals, and a repetitive description thereof is omitted as necessary.

Also, the programs described above may be stored and provided to a computer using various types of non-transitory computer readable media. Non-transitory computer readable media includes various types of tangible storage media. Examples of non-transitory computer-readable media include magnetic recording media (e.g., flexible disks, magnetic tapes, hard disks), magneto-optical recording media (e.g., magneto-optical disks), CD-ROM (Read Only Memory) CD-R, a CD-R/W, and a semiconductor memory (e.g., masked ROM, PROM (Programmable ROM), EPROM (Erasable PROM), flash ROM, RAM (Random Access Memory). The programs may also be supplied to the computer by various types of transitory computer-readable transitory computer readable media. Examples of transitory computer-readable media include an electrical signal, an optical signal, and an electromagnetic wave. The transitory computer readable media may provide the program to the computer via wired or wireless communication paths, such as an electrical wire and an optical fiber.

In the following embodiments, when required for convenience, the description will be made by dividing into a plurality of sections or embodiments, but except when specifically stated, they are not independent of each other, and one of them is related to some or all of the other modified example, applications, detailed description, supplementary description, or the like. In the following embodiments, the number of elements, etc. (including the number of elements, numerical values, quantities, ranges, etc.) is not limited to the specific number, but may be not less than or equal to the specific number, except for cases where the number is specifically indicated and is clearly limited to the specific number in principle.

Furthermore, in the following embodiments, the constituent elements (including the operation steps and the like) are not necessarily essential except in the case where they are specifically specified and the case where they are considered to be obviously essential in principle. Similarly, in the following embodiments, when referring to the shapes, positional relationships, and the like of components and the like, it is assumed that the shapes and the like are substantially approximate to or similar to the shapes and the like, except for the case in which they are specifically specified and the case in which they are considered to be obvious in principle, and the like. The same applies to the above-mentioned numbers and the like, including the number, the numerical value, the amount, the range, and the like.

FIG. 1 is a block diagram showing a hardware configuration of a semiconductor device according to a first embodiment. The semiconductor device (semiconductor integrated circuit device) 10 includes a CPU11, a ROM12, a RAM13, a peripheral circuit 14, and a bus 16. The semiconductor device 10 is configured as a microcomputer unit (Micro Computer Unit) including, for example, a multi-core processor. The semiconductor device 10 is mounted on, for example, a vehicle such as an automobile. The semiconductor device 10 is used, for example, in a DSM (Driver Status Monitor), a meter cluster, or the like, in vehicle. The semiconductor device 10 may be configured as a system for performing thermal control, and the application of the semiconductor device 10 is not limited to a particular application.

The CPU11 configures a process executing unit in the semiconductor device 10, and executes various application programs as examples of tasks. The CPU11 includes a plurality of CPU cores. The CPU11 is configured to have a variable operating condition. The CPU11 is configured so that, for example, the number of operating CPU cores is variable. The CPU11 is configured such that the operating frequencies of the respective CPU cores are variable. In the CPU11, thermal generation in the CPU11 can be controlled by controlling at least one of the number of operating CPU cores and the operating frequencies of the respective CPU cores.

The ROM12 is, for example, a nonvolatile memory such as a flash memory. The ROM12 stores a program to be executed by the CPU11. The CPU11 executes application programs read from the ROM12 (hereinafter, also referred to as applications, and can also be referred to as tasks) to execute various processes. The program stored in the ROM includes a program for performing thermal generation control of the CPU11. The RAM13 is a volatile memory for storing various data.

The peripheral circuit 14 includes various peripheral circuits built in the semiconductor device 10. The peripheral circuitry 14 includes, for example, a temperature sensor (THS) 15 for measuring temperature. The temperature sensor 15 includes, for example, a resistive element for varying the output voltage in dependence on the temperature. Alternatively, the temperature sensor 15 includes an oscillator, such as a ring oscillator, which oscillates at a period dependent on temperature. As the temperature sensor 15, various types temperature sensors can be used, and the type of the temperature sensor 15 is not particularly limited. In the semiconductor device 10, the RAM13 and peripheral circuit 14 and the like are connected to the CPU11 via buses 16.

The semiconductor device 10 may include an external peripheral circuit arranged outside and an input/output port (not shown) for inputting/outputting signals to/from other devices. Although the temperature sensor 15 is included in the peripheral circuitry 14 inside the semiconductor device 10, the temperature sensor 15 is not limited to being built in the semiconductor device 10. The temperature sensor 15 may be disposed in an external peripheral circuit, and signals outputted from the temperature sensor 15 may be input to the semiconductor device 10 through an input/output port.

In recent years, in order to meet the needs of the semiconductor device markets such as large-capacity, high-performance, low-cost, and enhanced user experience, semiconductor processes have been accelerated rapidly. Semiconductor device has become a large-scale SoC (System-on-a-chip) with a plurality of high-performance and high-power hardware modules, and its importance to thermal generation countermeasures has been increasing. However, even if the thermal generation control is necessary, it is not preferable that the function related to the safety of the driver is limited or the user experience is seriously impaired by performing the thermal generation control, for example, in the in-vehicle field. The present embodiment provides a mechanism that enables fine thermal generation control while maintaining the performance of such a function.

Figure 2:
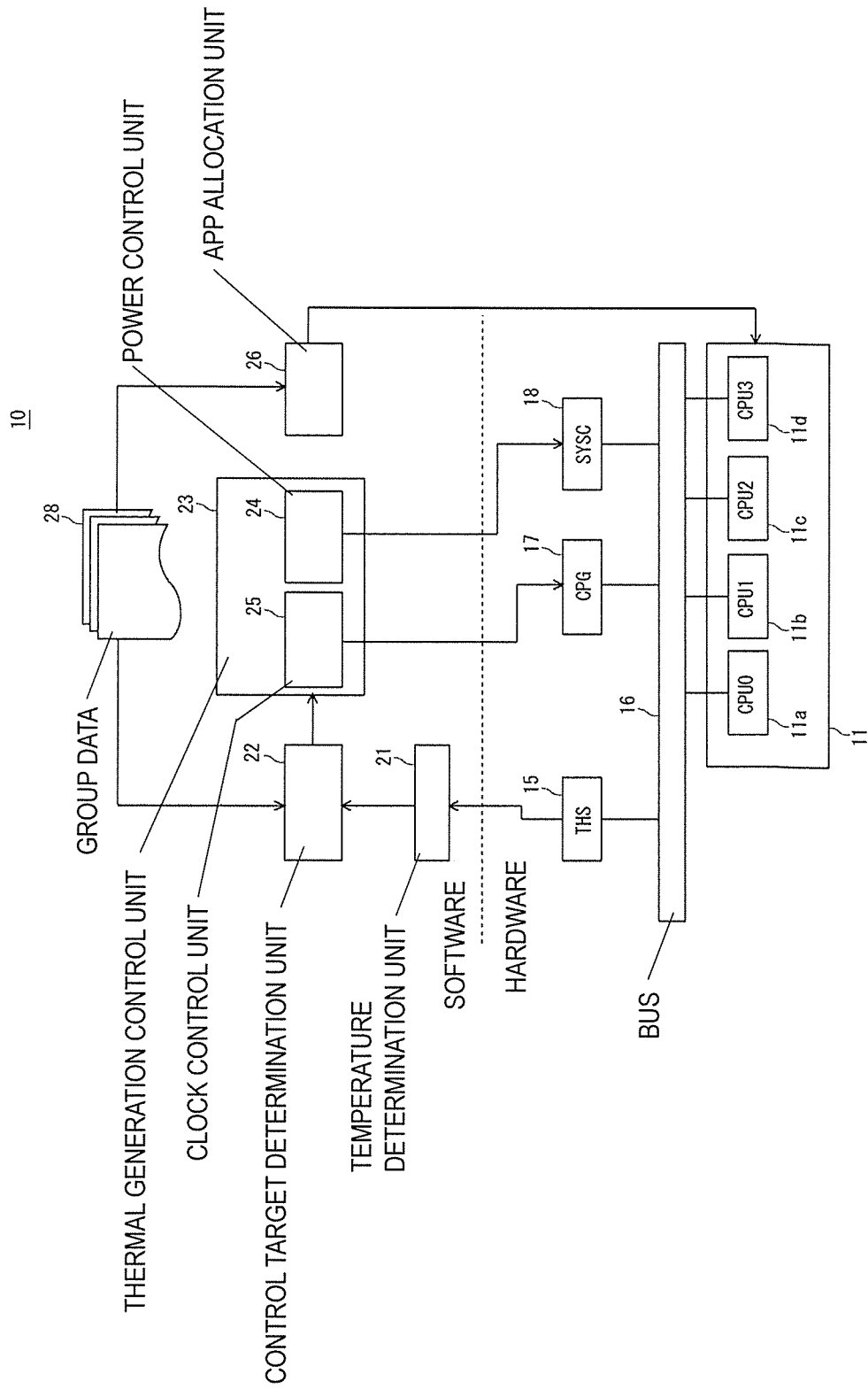
FIG. 2 is a functional diagram showing the portion related to thermal generation control of semiconductor device.

FIG. 2 is a functional diagram showing the portion related to thermal generation control of semiconductor device. The semiconductor device 10 has functions of a temperature determination unit 21, a control target determination unit 22, a thermal generation control unit 23, and an application allocation unit 26. In addition to the components shown in FIG. 1, the semiconductor device 10 includes a clock pulse generator (clock pulse generator) 17 and a system controller (SYSC:system controller) 18. Hereinafter, examples will be mainly described in which the CPU11 has four CPU cores of the CPU cores 11a to 11d (CPU0 to 3).

In the semiconductor device 10, the functions of the temperature determination unit 21, the control target determination unit 22, the thermal generation control unit 23, and the app allocation unit 26 are implemented by software, for example. In other words, the functions of the temperature determination unit 21, the control target determination unit 22, the thermal generation control unit 23, and the app allocation unit 26 are realized in accordance with a program read from the ROM12 (see FIG. 1) by the CPU11, for example. For example, the function of the control target determination unit 22 may be implemented by incorporating the function into a driver or the like that are operable on the OS (operating system). In the semiconductor device 10, the temperature determination unit 21, the control target determination unit 22, and the thermal generation control unit 23 constitute a temperature control device for controlling the temperature of the CPU11 to be controlled.

The temperature determination unit 21 is connected to the temperature sensor 15, and monitors the temperature measured using the temperature sensor 15. The temperature determination unit 21 determines whether or not thermal generation control is performed on the CPU11 based on the temperature measured using the temperature sensor 15. The temperature determination unit 21 compares, for example, the temperature measured using the temperature sensor 15 with a preset threshold value, and determines that the thermal generation control is executed when the temperature is equal to or higher than the threshold value.

When the temperature determination unit 21 determines that the temperature is equal to or higher than the threshold value, the thermal generation control unit 23 performs thermal generation control on the CPU11 and controls the amount of thermal generated in the CPU11. In the thermal generation control, the thermal generation control unit 23 controls the amount of thermal generated in the CPU11 by changing the operation condition of the CPU11.

The thermal generation control unit 23 includes a power supply control unit 24 and a clock control unit 25. The power control unit 24 controls power supplied to each of the plurality of CPU cores 11a to 11d included in the CPU11 through the system controller 18. The power supply control unit 24 supplies power to the CPU core to be operated among the four CPU cores 11a to 11d, and shuts off the power of the CPU core not to be operated.

The clock control unit 25 controls the operating frequencies of the CPU cores 11a to 11d by controlling the frequencies of the clock signals supplied to the CPU cores 11a to 11d through the clock pulse generator 17. The clock control unit 25 supplies a clock signal of the determined operation frequency to the CPU core to which the power supply control unit 24 supplies power, from the four CPU cores 11a to 11d. By controlling the operation number of CPU cores to which power is supplied by the power supply control unit 24 and the frequency of clock signals supplied to the CPU cores by the clock control unit 25, the thermal generation state in the CPU11 is controlled.

The threshold value for judging whether or not the temperature judging unit 21 is in a state of performing thermal generation control may include a plurality of stages of threshold values. For example, the threshold may include a first stage threshold and a second stage threshold at a higher temperature. When the measured temperature is lower than the threshold value of the first step, the temperature determination unit 21 determines that the temperature is in a low temperature state in which thermal generation control is not necessary. When the measured temperature is equal to or higher than the threshold value of the first phase and lower than the threshold value of the second stage, the temperature determination unit 21 determines that the intermediate temperature state is a state in which the thermal generation control of the first stage is performed. When the measured temperature is equal to or higher than the threshold value of the second stage, the temperature determination unit 21 determines that the state is a high temperature state in which the second stage thermal generation control is performed. Note that the number of stages of the threshold value is not particularly limited to two, and the threshold value may include three or more stages.

When temperature determination unit 21 determines that the temperature is low, the thermal generation control unit 23 does not perform the thermal generation control of the CPU11. When the temperature determination unit 21 determines that the temperature is in the intermediate temperature state, the thermal generation control unit 23 performs the first step thermal generation control. In the first stage thermal generation control, the thermal generation control unit 23 reduces the amount of thermal generated by the CPU11 by using, for example, the clock control unit 25 to lower the operating frequencies of the specific CPU core. When the temperature determination unit 21 determines that the temperature is in the high temperature state, the thermal generation control unit 23 performs the second stage thermal generation control. The thermal generation control in the second stage has a larger amount of reduction in the amount of thermal generation than the thermal generation control in the first stage. In the thermal generation control of the second stage, for example, the thermal generation control unit 23 further uses the power supply control unit 24 in addition to the thermal generation control of the first stage to cut off the power supply to the specific CPU core, thereby further reducing the amount of thermal generated by the CPU11. Note that the thermal generation control performed by the thermal generation control unit 23 is not particularly limited to the clock control and the power supply control. For example, the thermal generation control unit 23 may control the amount of thermal generated in the CPU11 by controlling the amount of power consumed in the CPU core by controlling the magnitude of the voltages supplied to the CPU core.

Here, the priorities of the applications executed in the CPU11 are set according to the importance of the functions and the like. The priority is set according to the use case, for example. For example, the priority of an application such as a DSM, which does not cause a large problem even if the function is temporarily stopped in the operation of the vehicle, is set to a low priority. On the other hand, if the function such as the meter cluster function stops, the priority of the application of the function that hinders the driving of the vehicle is set to high priority.

The group data 28 retains a correspondence relationship between the application of each priority and the CPU core to which the execution is allocated. In the present embodiment, the group data 28 includes high priority group information and low priority group information. The high priority group information includes information specifying the CPU cores of the high priority group to which the high priority application is allocated to execute in the CPU11. The low priority group information includes information specifying CPU cores of a low priority group to which low priority applications are allocated to execute in the CPU11.

When the temperature determination unit 21 determines that the temperature is in the medium temperature state or the high temperature state, the control target determination unit 22 uses the group data 28 to determine the CPU core to be controlled by the thermal generation control unit 23. The control target determining unit 22 determines at least one of the CPU cores designated as the CPU cores of the low priority group in the group data 28 as the CPU cores to be subjected to the thermal generation control. The thermal generation control unit 23 controls at least one of the operating frequency of the CPU core determined as the control target and the power supply to the CPU core, thereby reducing the amount of thermal generated in the CPU11.

The app allocation unit 26 determines a CPU core to which the execution of the application is allocated based on the group data 28 when the application is executed. The App allocation unit 26 allocates execution of a high-priority application to any of the CPU cores of the high-priority group. On the other hand, the app allocation unit 26 allocates the execution of the low-priority application to one of the CPU cores of the low-priority group. In this way, the high priority and low priority applications can be executed by the CPU cores corresponding to the respective groups in the CPU11. The function of the app allocation unit 26 is installed in, for example, an operating system (OS) such as Linux (registered trademark) operating on the semiconductor device 10.

FIG. 3A shows an example of high priority group information, and FIG. 3B shows an example of low priority group information. In the example of FIG. 3A, three applications A, B, and C are stored in association with the group type "high priority". The CPU core 11a (CPU0) and the CPU core 11b (CPU1) are stored as CPU cores to which applications are allocated to the group type "high-priority".

On the other hand, in the example of FIG. 3B, three applications D, E, and F are stored in association with the group type "low priority". The CPU core 11c (CPU2) and the CPU core 11d (CPU3) are stored as CPU cores to which applications are allocated to the group type "low-priority".

FIGS. 4A and 4B are schematic diagrams showing a relationship between an application of each priority and a CPU core to which execute is allocated. When the group data 28 retains the information shown in FIG. 3A as high-priority group information, the app allocation unit 26 allocates the execution of the application A, B, or C to the CPU care 11a or 11b when the application A, B, or C is executed (refer to FIG. 4A). The App allocation unit 26 does not allocate the execution of the application A, B, or C to the CPU core 11c or 11d.

When the group data 28 retains the information shown in FIG. 3(b) as low priority group information, the app allocation unit 26 assigns the execution to the CPU core 11c or 11d when the application D, E, or F is executed (refer to FIG. 4B). The App allocation unit 26 does not allocate the execution of the application D, E, or F to the CPU core 11a or 11b. In this manner, when the group data 28 includes the information shown in FIG. 3A and the information shown in FIG. 3B, the high priority application and the low priority application can be executed by different CPU core groups.

Figure 5:
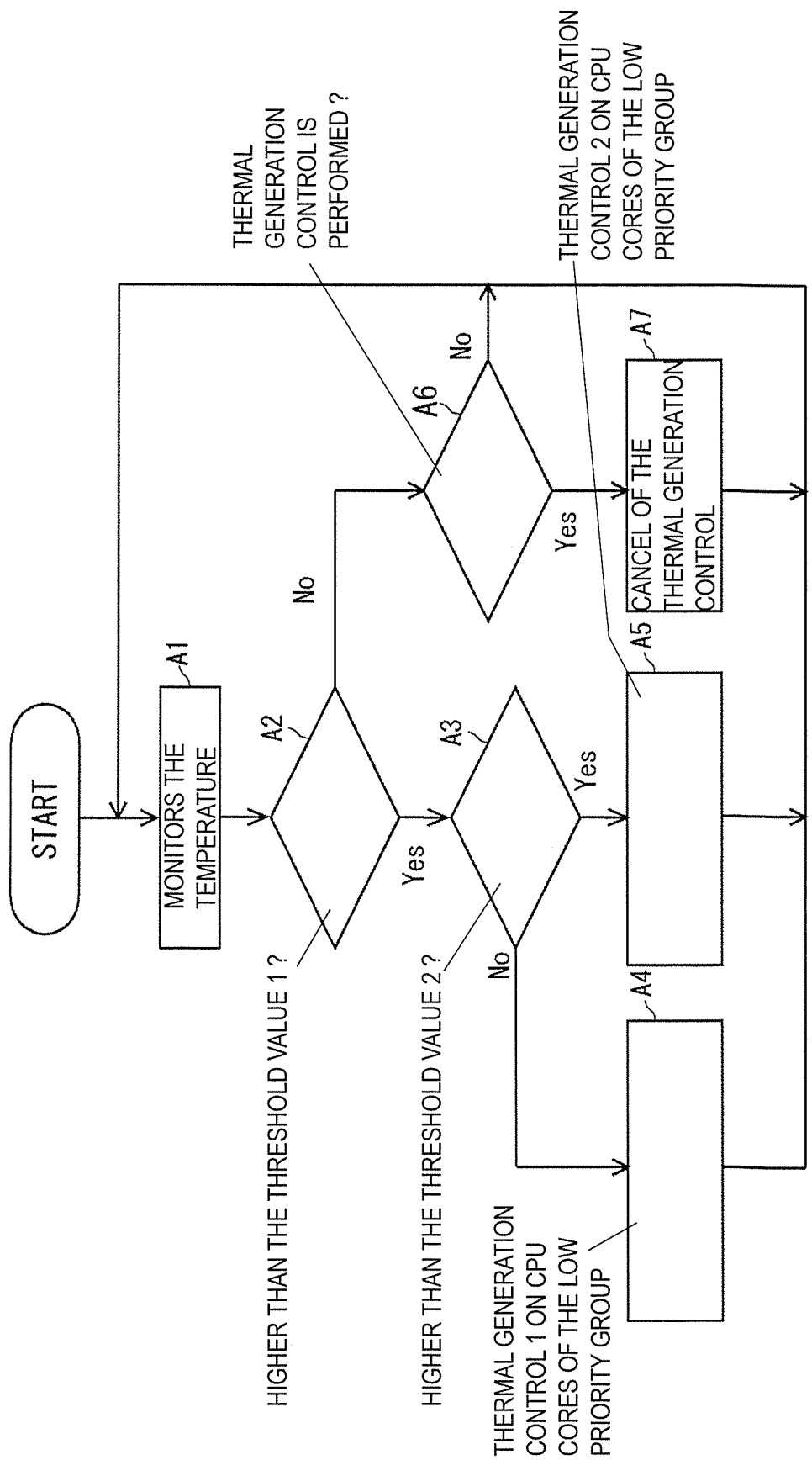
FIG. 5 is a flow chart showing the operating procedure of thermal generation control.

FIG. 5 is a flow chart showing the operating procedure of thermal generation control. The user creates the high priority group information and the low priority group information associating the CPU core and the application the group data 28 in advance. The user divides the application running on the semiconductor device 10 into a high priority application and a low priority application based on the importance of functions related to the safety of the driver of the vehicle on which the semiconductor device is mounted, for example, and functions related to the user experience. Users may divide applications into high priority applications and low priority applications based on the importance of IP cores, such as Secure IP (Intellectual Property) and IP for Function Safety. The method of determining the high priority application and the low priority application is not particularly limited to those described above. In the group data 28, the user designates the CPU core to which the execution of the high priority application and the low priority application is allocated, respectively.

The temperature determination unit 21 acquires temperature data from the temperature sensor 15 and monitors the temperature of the semiconductor device 10 (step A1). The temperature determination unit 21 determines whether or not the temperature is equal to or higher than the threshold value (threshold value 1) of the first stage (step A2). The threshold value 1 is set to, for example, Tj=90° C., and the temperature determination unit 21 determines whether or not the temperature information acquired from the temperature sensor 15 is 90° C. or more in step A2.

When the temperature is equal to or higher than the threshold value 1, the temperature determination unit 21 determines whether or not the temperature is equal to or higher than the threshold value (threshold value 2) of the second stage (step A3). The threshold value 2 is set to, for example, Tj=110° C., and the temperature determination unit 21 determines whether or not the temperature information acquired from the temperature sensor 15 is 110° C. or more in step A3. When it is determined in step A3 that the temperature is lower than the threshold value 2, the temperature determination unit 21 determines that the temperature of the semiconductor device 10 is "medium temperature". On the other hand, when it is determined in A3 that the temperature is equal to or higher than the threshold value 2, the temperature determination unit 21 determines that the temperature of the semiconductor device 10 is "high temperature".

When the temperature determination unit 21 determines that the temperature is "medium temperature" or "high temperature", the control target determination unit 22 refers to the group data 28, and determines all or part of the CPU core of the low priority group, that the CPU core associated with the group type "low priority" (see FIG. 3B) as the target of the thermal generation control. When the temperature determination unit 21 determines that the temperature is "medium temperature", the thermal generation control unit 23 performs the first stage thermal generation control (thermal generation control 1) on the CPU cores of the low priority group (step A4). For example, when the CPU cores of the low priority group are the CPU cores 11c and 11d, the thermal generation control unit 23 performs the thermal generation control 1 on the CPU cores 11c and 11d. For example, in the thermal generation control 1, the thermal generation control unit 23 uses the clock control unit 25 to lower the clock frequency supplied to the CPU core of the low priority group. After the thermal generation control 1 is performed, the process returns to step A1, and the temperature monitoring is continued.

When the temperature determination unit 21 determines "high temperature" in step A3, the thermal generation control unit 23 performs the second stage thermal generation control (thermal generation control 2) on the CPU cores of the low priority group (step A5). For example, in the thermal generation control 2, the thermal generation control unit 23 uses the power supply control unit 24 to control the power supply supplied to the CPU cores of the low priority group. After the thermal generation control 2 is performed, the process returns to step A1, and the temperature monitoring is continued.

The temperature determination unit 21 determines that the temperature of the semiconductor device 10, which is determined to be lower than the threshold value 1 in the step A2, is "low temperature (appropriate temperature)". When the temperature determination unit 21 determines that the temperature is "low", the thermal generation control unit 23 determines whether or not the thermal generation control is performed (step A6). In step A7, when the thermal generation control 1 in step A4 or the thermal generation control 2 in step A5 is performed, the thermal generation control unit 23 cancels the thermal generation control. After the release of the thermal generation control, the process returns to step A1, and the temperature monitoring is continued. If it is determined in step A6 that the thermal generation control is not being performed, the process returns to step A1, and the temperature monitoring is continued.

Figure 6:
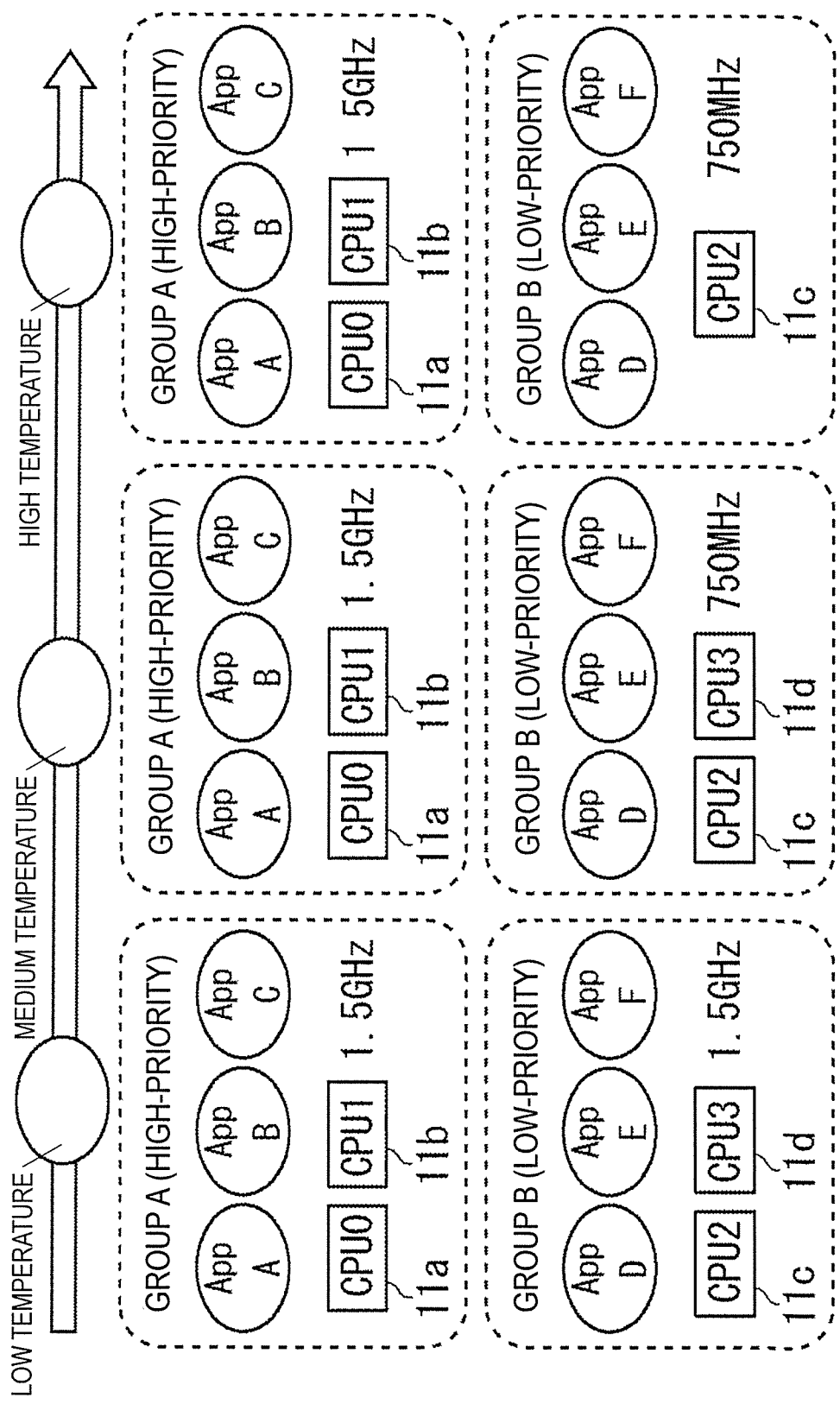
FIG. 6 is a schematic diagram showing an example of operation.

Hereinafter, an operation example will be described. FIG. 6 is a schematic diagram showing an example of operation. In the following description, it is assumed that the four CPU cores 11a to 11d are operable at an operation frequency selected from 500 MHz, 750 MHz, 1.0 GHz, 1.5 GHz, 1.6 GHz, and 1.7 GHz, respectively. The operating frequency of each CPU core is assumed to be 1.5 GHz by default. Further, in the group data 28, it is assumed that the applications A, B, and C and the CPU cores 11a and 11b are stored in association with each other in the group information of the group A having the group type "high priority". Further, it is assumed that the applications D, E, and F and the CPU cores 11c and 11d are stored in association with each other in the group information of the group B having the group type "low priority".

If it is determined in step A2 (see FIG. 5) that the temperature is lower than the threshold value 1, the temperature determination unit 21 determines that the semiconductor device 10 is "low temperature". In the "low temperature" state, the thermal generation control is not performed, and the CPU cores 11a and 11b to which the execution of the application of the group A is allocated operate at 1.5 GHz. The CPU cores 11c and 11d to which the execution of the application of the group B is allocated also operate at 1.5 GHz in the same manner. In this instance, each of the applications A-F is executed at normal throughput in the CPU11.

When it is determined in step A2 that the temperature is equal to higher than the threshold value 1 and it is determined in step A3 that the temperature is lower than the threshold value 2, the temperature determination unit 21 determines that the semiconductor device 10 is "medium temperature". In step A4, the thermal generation control unit 23 performs the thermal generation control 1, and lowers the operating frequency of the CPU cores 11c and 11d of the low priority group B from 1.5 GHz to 750 MHz. In this case, the applications D to F are executed by the CPU cores 11c and 11d which are controlled at a low speed. However, since the applications D to F are low-priority applications that do not relate to, for example, the safety of the driver or the user experience, even if the operation speed is slowed, a large problem does not occur. On the other hand, the CPU cores 11a and 11b of the group A operate at an operating frequency of 1.5 GHz, and the high-priority applications A to C are executed with normal processing capabilities. Of the four CPU cores 11a to 11d, the CPU cores 11c and 11d of the group B operate at a low speed, whereby the amount of thermal generated by the CPU11 can be reduced and the temperatures can be expected to be lowered.

When it is determined that the temperature is equal to or higher than the threshold value 2 in block A3, the temperature determination unit 21 assessments that the semiconductor device 10 is "high temperature". In this case, the thermal generation control unit 23 performs the thermal generation control in step A5, and shuts off the power of the CPU core 11d among the CPU cores 11c and 11d of the low priority group. At this time, the CPU core 11c operates at a reduced operating frequency of 750 MHz. In this case, the applications D to F are executed only by the CPU core 11c. By shutting down one of the CPU cores 11c and 11d of the group B, the thermal generation amount in the CPU11 can be further reduced in thermal generation control 2 performed in the high-temperature state compared to the thermal generation control 1 performed in the medium-temperature state. Even in the high-temperature state, the CPU cores 11a and 11b of the group A operate at an operating frequency of 1.5 GHz, and the high-priority applications A to C are executed with normal processing capabilities.

When the temperature determination unit 21 determines that the temperature is "low temperature" and when the thermal generation control 1 or the thermal generation control 2 is being executed, the thermal generation control unit 23 cancels the thermal generation control in step A7. For example, when the operation frequency is changed to "medium temperature" or "low temperature", the thermal generation control unit 23 changes the operation frequency of the low-priority CPU cores 11c and 11d from 750 MHz to 1.5 GHz in step A7. In the case of converting from "high temperature" to "low temperature", the thermal generation control unit 23 restarts power supply to the CPU core 11d and changes the operating frequency of the CPU cores 11c and 11d from 750 MHz to 1.5 GHz in step A7. In this way, each of the applications A to F is executed in the CPU11 with normal throughput.

In the present embodiment, the group data 28 includes high priority group information including information specifying a CPU core to which execute of a high priority application is allocated, and low priority group information including information specifying a CPU core to which execution of a low priority application is allocated. The control target determining unit 22 refers to the group data 28 and determines the CPU core of the low priority group as the target of the thermal generation control. When the temperature determination unit 21 determines that the temperature is equal to or higher than the threshold value, the thermal generation control unit 23 performs thermal generation control on the CPU cores of the low priority group. When the thermal generation control is performed on the CPU cores of the low priority group, the function of the low priority application to which the execution is allocated to the CPU cores of the low priority group is reduced or the function is stopped. On the other hand, since the thermal generation control is not performed on the CPU cores of the high-priority group, the high-priority application to which the execution is allocated to the CPU cores of the high-priority group is not affected by the thermal generation control. Therefore, in the present embodiment, it is possible to reduce the amount of thermal generated by the CPU while maintaining the execution performance of the high-priority application.

For example, in the group data 28, the application of functions related to the safety of the driver and the user experience, such as the meter cluster function, is set to high priority. Further, in the group data 28, the priority of the application of the function not directly related to the safety of the driver such as the DSM function or the user experience is set to a low priority. When the temperature of the semiconductor device 10 rises, the performance of the DSM function is degraded or stopped by performing thermal generation control on the CPU core to which the CPU core is allocated to execute the low-priority application. However, even if the DSM function is stopped, the operation of the vehicle is not hindered, and therefore, a large problem does not occur. On the other hand, in the present embodiment, since the thermal generation control is not performed on the CPU core to which the execution of the high-priority application is allocated, the performance of the meter cluster function is not degraded. As described above, in the present embodiment, it is possible to reduce the calorific value in the CPU11 while preventing the performance deterioration of the critical functions such as the meter cluster function.

In the present embodiment, a plurality of stages of threshold values are provided in the temperature determination unit 21, and a plurality of stages of thermal generation control are performed in the thermal generation control unit 23. As the temperature increases, the temperature of the semiconductor device 10 can be effectively lowered by performing the thermal generation control in which the reduction range of the thermal generation amount is large.

Embodiment 2

Figure 7:
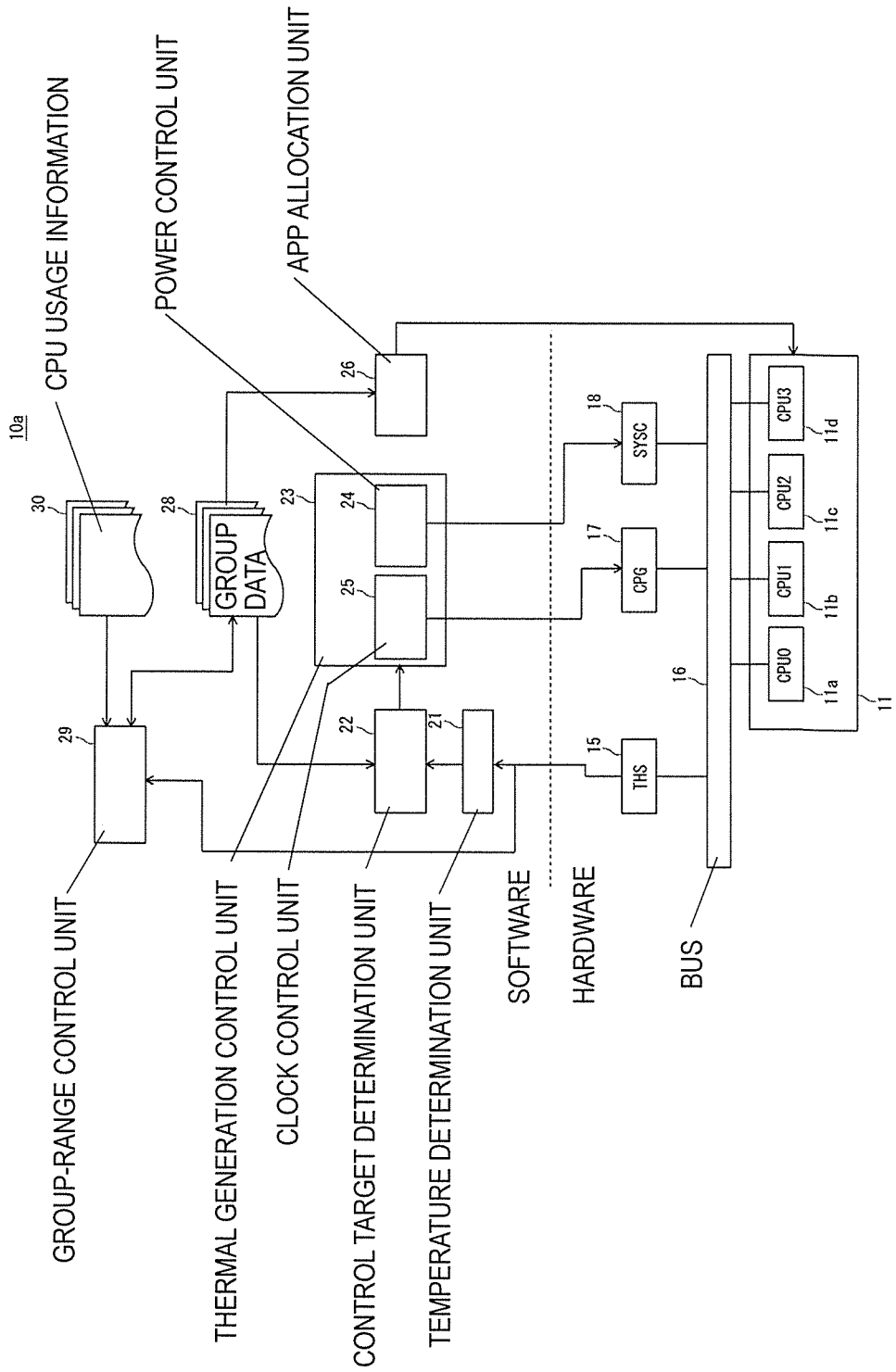
FIG. 7 is a diagram showing a semiconductor device according to a second embodiment.

FIG. 7 is a diagram showing a semiconductor device according to a second embodiment. The semiconductor device 10a according to the present embodiment includes a group-range control unit 29 in addition to the constituent elements of the semiconductor device 10 according to the first embodiment shown in FIG. 2. The group-range control unit 29 controls the operation number of CPU cores of the low-priority group based on the group data 28 and the number of high-priority applications being executed in the CPU11. In other words, the group-range control unit 29 enlarges or reduces CPU cores to be subjected to thermal generation control in the CPU11 based on the group data 28 and the number of high-priority applications being executed in the CPU11. Other points may be the same as those in Embodiment 1.

Here, in the first embodiment, for example, when the execution of the high-priority application is allocated to the CPU cores 11a and 11b (see FIG. 2) and the execution of the low-priority application is allocated to the CPU cores 11c and 11d, the execution the low-priority application is not allocated to the CPU cores 11a and 11b. Therefore, for example, even if the number of high-priority applications being executed by the CPU cores 11a and 11b is one and the CPU core is one idle state, the CPU core in the idle state cannot be used to execute the low-priority application. The present embodiment provides a means for improving such a situation.

The CPU usage information 30 holds information indicating the number of applications to which execute is allocated to each CPU core. The number of applications to which execute is allocated to each CPU core can be detected by a function of a general OS. The group-range control unit 29 refers to the CPU usage information 30, and acquires the number of high-priority applications being executed in the CPU11. The group-range control unit 29 compares the operable number of CPU cores of the high-priority group with the number of high-priority applications being executed in the CPU11, and controls the operation number of CPU cores of the low-priority group based on the result of the comparison.

In the present embodiment, for example, in the default state, in the group data 28, the CPU core of the high priority group specified by the high priority group information and the CPU core of the low priority group specified by the low priority group information overlap at least partially. The group-range control unit 29 acquires temperature information from the temperature sensor 15. When the acquired temperature information is equal to or higher than a predetermined temperature, the group-range control unit 29 controls the operation number of CPU cores in the low priority group. The "predetermined temperature" may be equal to the threshold value 1 or the threshold value 2 used for the determination by the temperature determination unit 21. In this case, the operation number of CPU cores in the low priority group is controlled when the thermal generation control 1 or the thermal generation control 2 is performed.

For example, when the temperature changes from a state in which the temperature is lower than a predetermined temperature to a state in which the temperature is equal to or higher than a predetermined temperature, the group-range control unit 29 exclusively divides the CPU core included in the CPU11 into the CPU core of the high-priority group and the CPU core of the low-priority group at a predetermined ratio, for example. When the operable number of the CPU cores of the high priority group is larger than the number of the high priority applications being executed in the CPU11, the group-range control unit 29 increases the operation number of the CPU cores of the low priority group. At this time, the group-range control unit 29 increases the operation number of CPU cores of the low priority group by overlapping at least a part of the CPU cores of the high priority group specified by the high priority group information with a part of the CPU cores of the low priority group specified by the low priority group information in the group data 28. After increasing the operation number of CPU cores of the low priority group, the group-range control unit 29 decreases the number of CPU cores of the low priority group when the number of CPU cores of the high priority group becomes equal to or less than the operation number high priority applications being executed.

[Operation Procedure]

Figure 8:
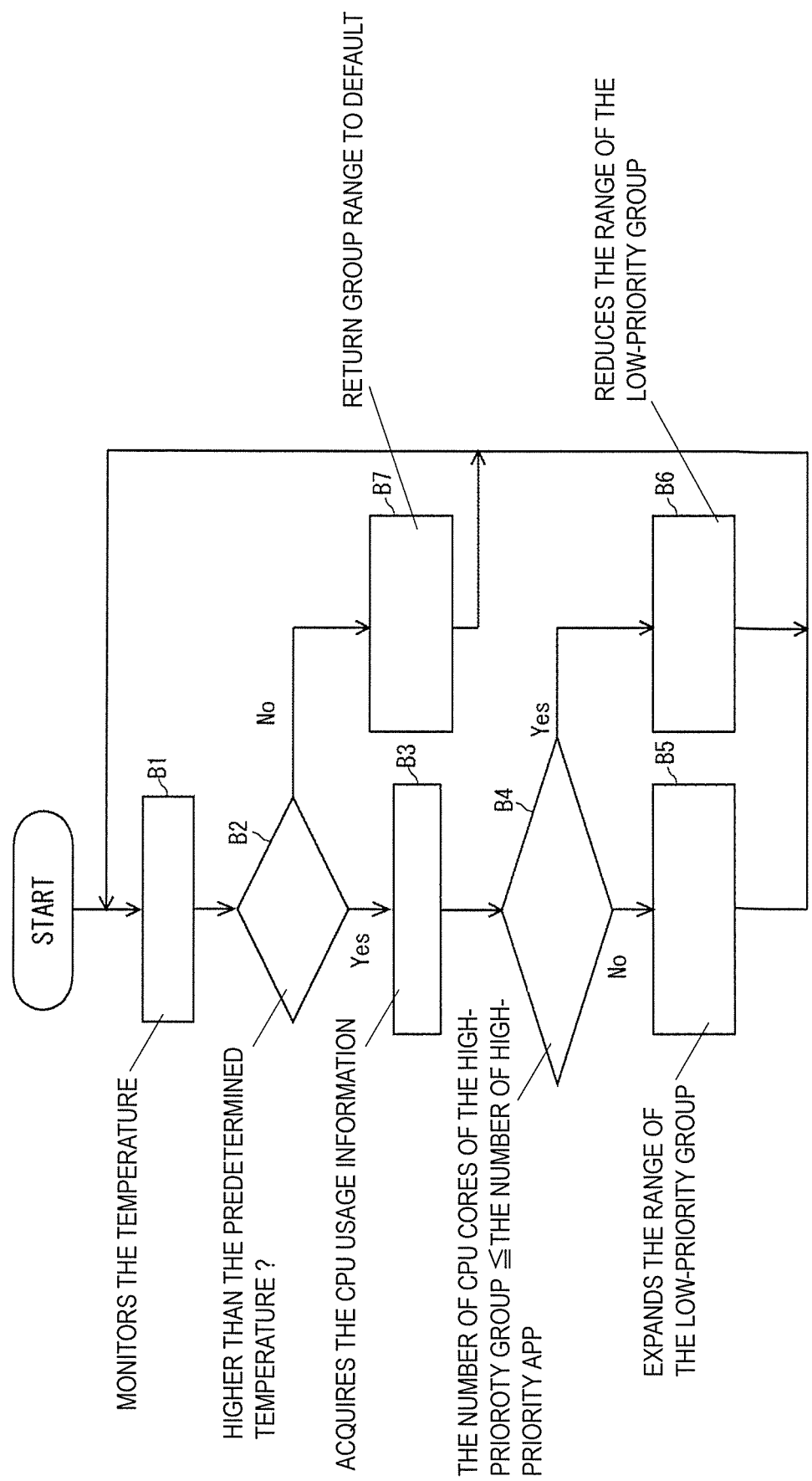
FIG. 8 is flow chart showing the operation procedure related to the control of the group scope.

Operating procedures are described below. The operation procedure related to the thermal generation control in the present embodiment may be the same as the procedure shown in FIG. 5. FIG. 8 is flow chart showing the operation procedure related to the control of the group scope. The group-range control unit 29 acquires temperature data from the temperature sensor 15, and monitors the temperature of the semiconductor device 10 (step B1). In step B2, the group-range control unit 29 determines whether or not the temperature is equal to or higher than a predetermined temperature. In step B2, the group-range control unit 29 determines whether or not the temperature is, for example, Tj=90° C., or more. Alternatively, the group-range control unit 29 determines whether or not the temperature is equal to or higher than Tj=110° C. When the predetermined temperature in step B2 is the same as the temperature threshold in step A2 or A3 (see FIG. 5), the group-range control unit 29 may receive the result of the temperature determination from the temperature determination unit 21.

When the group-range control unit 29 determines that the temperature is equal to or higher than the predetermined temperature in step B3, the group range control unit 29 refers to the CPU usage information 30 and acquires the CPU usage information in step B3. In step B3, the group-range control unit 29 refers to the CPU usage information, for example, and specifies the number of high-priority applications being executed in the CPU11. The group-range control unit 29 compares the operable number of high-priority applications being executed in the CPU11 with the number of CPU cores of the high-priority group, and determines whether or not the operable number of CPU cores of the high-priority group is equal to or less than the number of high-priority applications (step B4). If the operable number of CPU cores in the high priority group is less than or equal to the number of high priority applications, each CPU core in the high priority group is allocated execution of at least one application. In this case, there is no CPU core to which the execution of the application is not allocated in the CPU core of the high-priority group. On the other hand, when the operable number of CPU cores of the high priority group is larger than the number of high priority applications, the CPU cores of the high priority group include at least one CPU core to which execution of the application is not allocated.

If it is determined in step B4 that the operable number of CPU cores in the high-priority group is not equal to or smaller than the number of high-priority applications, the group range control unit 29 corrects the group data 28 and expands the range of the low-priority group in step B5. In step B5, the group range control unit 29 may expand the range of the low priority group in accordance with the difference between the operation number of CPU cores of the high priority group and the number of high priority applications being executed. In step B5, for example, the group-range control unit 29 adds a CPU core to which application execution is not allocated among the CPU cores of the high-priority group to the CPU core designated by the low-priority group information, thereby expanding the range of the low-priority group. By doing so, the execution of the low priority application can be allocated to the CPU core to which the execution of the high priority application is not allocated, which is included in the high priority group.

If it is determined in step B4 that the operable number of CPU cores in the high-priority group is equal to or less than the number of high-priority applications, the group-range control unit 29 corrects the group data 28 and reduces the range of the low-priority group in step B6. In step B6, the group-range control unit 29 may expand the range of the low priority group in accordance with the difference between the operation number of CPU cores of the high priority group and the number of high priority applications being executed. In step B6, for example, the group-range control unit 29 reduces the range of the low priority group by deleting the CPU core added to the low priority group information in step B5 from the low priority group information. By doing so, it is possible to secure a CPU core to which execute of a high-priority application is allocated in a high-priority group.

When the group data 28 is modified in step B5 or B6, the app allocation unit 26 changes the application allocation in accordance with the modified group data 28. For example, when the range of the low priority group is enlarged in step B5, if two applications are executed in one CPU core in the low priority group, the app allocation unit 26 causes one of the two applications to be executed in the enlarged CPU core. On the other hand, when the low priority group is reduced in step B6, the app allocation unit 26 causes the application executed by the reduced CPU core to be executed by the CPU core when there is a CPU core available in the low priority group. Such a function is a function of a common operating system such as the Linux.

Figures 9A, 9B, 9C:
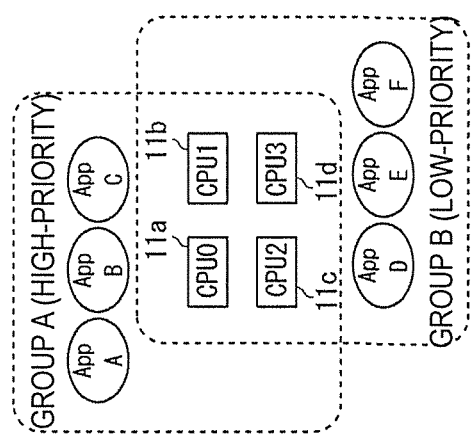
FIGS. 9A and 9B show high-priority group information and low-priority group information, respectively
FIG. 9C shows the relationship between applications in each group and the core CPUs to which execute is allocated.

Hereinafter, an operation example will be described. FIGS. 9A and 9B show high-priority group information and low-priority group information, respectively and 9C shows the relationship between applications in each group and the core CPUs to which execute is allocated. In FIG. 9A, three applications A, B, and C are stored in association with the group type "high-priority", and the CPU cores 11*a* to 11*d* (CPU0~CPU3) are stored as the CPU cores to which the applications are allocated.

In FIG. 9B, three applications D, E, and F are stored in association with the group type "low-priority", and the CPU cores 11*a* to 11*d* (CPU0~CPU3) are stored as the CPU cores to which the applications are allocated. Group data 28, for example in a default state, i.e. before it is determined that the temperature has reached a predetermined temperature in step B1 of FIG. 8, holds the high-priority group information and low-priority group information shown in FIGS. 9A and 9B.

In the above cases, as shown in FIG. 9C, the executions of the applications A, B, and C belonging to the group A (high-priority group) are allocated to any one of the four CPU cores 11a to 11d (CPU0~CPU3). Executions of the applications D, E, and F belonging to the group B (low-priority group) are also allocated to any one of the four CPU cores 11a to 11d (CPU0~CPU3). Thus, in the default-state, in the CPU11, the CPU cores to which the applications are allocated overlap in the high-priority group and the low-priority group, and the respective applications can be executed by any CPU core.

FIGS. 10A to 10C are schematic diagrams showing a relationship between an application and a CPU core to which execution of the application is allocated. For example, in step B2 (see FIG. 8), when it is determined that the temperature of the semiconductor device 10 has become equal to or higher than a predetermined temperature from a temperature lower than the predetermined temperature, it is assumed that the applications A and D to F have been executed in the CPU11 as shown in FIG. 10A. When the temperature changes from a temperature lower than the predetermined temperature to a temperature higher than the predetermined temperature, the group-range control unit 29 may temporarily divide the four CPU cores 11a to 11d into two groups, and compare the operable number of CPU cores of the high-priority group with the number of high-priority applications being executed in step B4. For example, it is assumed that the CPU cores 11a and 11b are allocated to the execution of the high-priority application, and the CPU cores 11c and 11d are allocated to the execution of the low-priority application. In this case, in the group A which is the high priority group, the number of operation allocatable CPU cores is 2, and the number of executing applications is 1. On the other hand, in the group B which is the low priority group, the number of operation allocatable CPU cores is 2, and the number of applications being executed is 3.

In the above case, it is determined in step B4 that the operable number of CPU cores of the high priority group is not equal to or less than the number of high priority applications being executed, and the group-range control unit 29 expands the range of the low priority group in step B5. For example, the group-range control unit 29 adds the CPU cores 11b (CPU1) to which the application is not allocated in the high-priority group to the "allocation CPU" of the low-priority group information shown in FIG. 3B. In this case, as shown in FIG. 10B, the operation number of CPU cores in the low priority group is increased to 3. When the low priority group information is changed, for example, the app allocation unit 26 allocates the execution of the application D allocated to the CPU core 11c or 11d to the CPU core 11b. By doing so, it is possible to allocate the execution of the low priority application to the CPU core 11b that was in the idle state in the high priority group, and it is possible to effectively use the CPU core.

Further, in the present embodiment, since the thermal generation control is performed on the CPU cores of the low priority group, in the state shown in FIG. 10A, even if one of the two CPU cores of the high priority group is not used, the CPU core cannot be the object of the thermal generation control. On the other hand, when the range of the low priority group is expanded as shown in FIG. 10B, the CPU core 11b belonging to the high priority group but not allocated the execution of the application can be the object of the thermal generation control. For example, when the power supply control unit 24 of the thermal generation control unit 23 shuts off the power supply of the CPU core 11b, the thermal generation amount in the CPU11 can be reduced.

In FIG. 10A, if no high-priority application is executed, the number of operation allocatable CPU cores in the group A, which is the high-priority group, is 2, and the number of applications being executed is 0. On the other hand, in the group B which is the low priority group, the number of operation allocatable CPU cores is 2, and the number of applications being executed is 3. In this case, the group-range control unit 29 may enlarge two CPU cores of the low priority group in step B5. For example, the group-range control unit 29 adds the CPU cores 11a and 11b (CPU0 and 1) to the "allocation CPU" of the low-priority group information shown in FIG. 3B. In this case, as shown in FIG. 10C, the operation number of CPU cores in the low priority group increases to four, and the App allocation unit 26 can arbitrarily allocate the execution of the low priority application to the four CPU cores 11a to 11d.

In the present embodiment, since the thermal generation control unit 23 performs the thermal generation control on the CPU core of the low priority group, there is a possibility that a high-priority application is executed in the CPU core when the CPU core overlapping between the high-priority group and the low-priority group becomes a target of the thermal generation control. In such a case, the app allocation unit 26 may cause the other CPU core of the high-priority group to execute the high-priority application executed by the CPU core which is the object of the thermal generation control. When there is a CPU core overlapping between the high priority group and the low priority group, the thermal generation control unit 23 may preferentially perform thermal generation control on a CPU core in which a high priority application is not executed among the CPU cores in the low priority group.

In the present embodiment, when the operation number of CPU cores in the high-priority group is larger than the number of high-priority applications being executed, the group-range control unit 29 enlarges the CPU cores available in the low-priority group. By doing so, the CPU core to which the execution of the application is not allocated in the high priority group can be used for the execution of the low priority application. In the present embodiment, since the CPU cores not used in the high priority group belong to the low priority group, the CPU cores can be subjected to thermal generation control. By performing the thermal generation control on the CPU core in the idle state in the high-priority group, it is possible to increase the reduction range of the thermal generation amount. Other effects are the same as those of Embodiment 1.

Although the invention made by the inventor has been specifically described based on the embodiment, the present invention is not limited to the embodiment already described, and it is needless to say that various modifications can be made without departing from the gist thereof.

What is claimed is:

1. A semiconductor device comprising:
   a CPU including a plurality of CPU cores, the plurality of CPU cores including (i) first CPU cores to which execution of applications of a first priority are allocated and (ii) second CPU cores to which execution of applications of a second priority are allocated, the second priority being lower than the first priority;
   a temperature determination unit for acquiring temperature information of the semiconductor device and determining whether a temperature indicated by the acquired temperature information is equal to or higher than a preset threshold;
   a thermal generation control unit for performing thermal generation control on the second CPU cores to control a thermal generation amount in the CPU when the temperature indicated by the temperature information is determined to be equal to or higher than the preset threshold; and a control target determination unit for determining a CPU core to be subjected to thermal generation control from among the second CPU cores, wherein the preset threshold value includes (i) a first threshold value and (ii) a second threshold value having a value larger than the first threshold value, wherein when the temperature indicated by the temperature information is equal to or higher than the first threshold value and lower than the second threshold value, the thermal generation control unit performs first thermal generation control on the second CPU cores, and wherein when the temperature indicated by the temperature is equal to or higher than the second threshold value, the thermal generation control unit performs second thermal generation control on the second CPU cores such that the thermal generation amount of the CPU is reduced more by the second thermal generation control than the first thermal generation control.

2. The semiconductor device as claimed in claim 1, wherein the thermal generation control unit includes at least one of a clock control unit for controlling a frequency of a clock signal supplied to each of the plurality of CPU cores, and a power supply control unit for controlling power supply to each of the plurality of CPU cores.

3. The semiconductor device as claimed in claim 1, wherein the thermal generation control unit includes a clock control unit for controlling a frequency of a clock signal supplied to each of the plurality of CPU cores, and a power supply control unit for controlling power supply to each of the plurality of CPU cores, and wherein, in the first thermal generation control, the clock control unit reduces a frequency of a clock signal supplied to at least one of the second CPU cores compared to before the thermal generation control is performed, and in the second thermal generation control, the power supply control unit shuts off a power supply supplied to at least one of the second CPU cores.

4. The semiconductor device as claimed in claim 1, further comprising an application allocation unit for allocating execution of the applications of the first priority to any of the first CPU cores and allocating execution of the applications of the second priority to any of the second CPU cores.

5. The semiconductor device as claimed in claim 1, further comprising a group range control unit for controlling the operation number of the second CPU cores and the number of the applications of the first priority being executed by the CPU.

6. The semiconductor device as claimed in claim 5, wherein the group range control unit compares the operable number of the first CPU cores with the number of the applications of the first priority being executed by the CPU, and controls the operation number of the second CPU cores based on a result of the comparison.

7. The semiconductor device as claimed in claim 6, wherein when the operable number of the first CPU cores is greater than the number of the applications of the first priority being executed by the CPU, the group range control unit increases the operation number of the second CPU cores as compared to when the operable number of the first CPU cores is less than or equal to the number of the applications of the first priority being executed by the CPU.

8. The semiconductor device as claimed in claim 7, wherein the group range control unit increases the operation number of the second CPU cores by overlapping at least a part of the first CPU cores with a part of the second CPU cores.

9. The semiconductor device as claimed in claim 5, wherein when the temperature indicated by the temperature information is lower than preset threshold, at least a part of the first CPU cores the second CPU overlap, and wherein the group range control unit controls the operation number of the second CPU cores when the temperature indicated by the temperature information is equal to or higher than the preset threshold.

10. A temperature control device comprising:
a temperature determination unit that:
acquires temperature information of a control target device including a CPU including a plurality of CPU cores, the plurality of CPU cores including (i) first CPU cores to which execution of applications of a first priority are allocated and (ii) second CPU cores to which execution of applications of a second priority are allocated, the second priority being lower than the first priority; and determine whether a temperature indicated by the acquired temperature information is equal to or higher than a preset threshold;

a thermal generation control unit for performing thermal generation control on the second CPU cores to control a thermal generation amount in the CPU when the temperature indicated by the temperature information is determined to be equal to or higher than the preset threshold; and a control target determination unit for determining a CPU core to be subjected to the thermal generation control from among the second CPU cores, wherein the preset threshold value includes (i) a first threshold value and (ii) a second threshold value having a value larger than the first threshold value, wherein when the temperature indicated by the temperature information is equal to or higher than the first threshold value and lower than the second threshold value, the thermal generation control unit performs first thermal generation control on the second CPU cores, and wherein when the temperature indicated by the temperature is equal to or higher than the second threshold value, the thermal generation control unit performs second thermal generation control on the second CPU cores such that the thermal generation amount of the CPU is reduced more by the second thermal generation control than the first thermal generation control.

11. A method for temperature control, the method comprising:
acquiring temperature information of a control target device including a CPU including a plurality of CPU cores, the plurality of CPU cores including (i) first CPU cores to which execution of applications of a first priority are allocated and (ii) second CPU cores to which execution of applications of a second priority are allocated, the second priority being lower than the first priority;

determining whether a temperature indicated by the acquired temperature information is equal to or higher than a preset threshold; and when the temperature indicated by the temperature information is determined to be equal to or higher than the preset threshold:
controlling a thermal generation amount in the CPU by performing thermal generation control on the second CPU core; and
determining a CPU core to be subjected to the thermal generation control from among the second CPU cores,
wherein the preset threshold value includes (i) a first threshold value and (ii) a second threshold value having a value larger than the first threshold value,
wherein when the temperature indicated by the temperature information is equal to or higher than the first threshold value and lower than the second threshold value, first thermal generation control is performed on the second CPU cores, and
wherein when the temperature indicated by the temperature is equal to or higher than the second threshold value, second thermal generation control is performed on the second CPU cores such that the thermal generation amount of the CPU is reduced more by the second thermal generation control than the first thermal generation control.

* * * * *